United States Patent [19]

Dunkelberger

[11] Patent Number: 4,539,375

[45] Date of Patent: Sep. 3, 1985

[54] DUNKELSPERSERS

[75] Inventor: David L. Dunkelberger, Newtown, Pa.

[73] Assignee: Rohm and Haas Company, Philadelphia, Pa.

[21] Appl. No.: 541,392

[22] Filed: Oct. 12, 1983

Related U.S. Application Data

[62] Division of Ser. No. 256,202, Apr. 21, 1981, Pat. No. 4,440,905.

[51] Int. Cl.³ .............................. C08F 4/04; C08F 4/34
[52] U.S. Cl. ..................................... 525/260; 525/222; 525/232; 525/240; 525/241; 525/302; 525/313; 525/314; 525/315; 525/316; 525/319; 525/322; 525/323; 525/426

[58] Field of Search ................. 525/80, 260, 263, 302, 525/313, 314, 315, 316, 319, 322, 323, 426

[56] References Cited

U.S. PATENT DOCUMENTS 3,671,607  6/1972  Lee ........................................ 525/84
4,304,709 12/1981  Salee ..................................... 525/68

Primary Examiner—Jacob Ziegler
Attorney, Agent, or Firm—Marc S. Adler

[57] ABSTRACT

Improved impact modifier composition comprising elastomeric impact modifier polymer and dunkelsperser in a weight ratio of about 99.5/0.5 to 96/4 which is subject to substantially reduced gel formation in rigid thermoplastic matrix polymer formulations. Also disclosed are such formulations, as well as processes for preparing the improved impact modifier compositions.

1 Claim, 2 Drawing Figures

EXAMPLE 6

EXAMPLE 15

DUNKELSPERSERS

This is a division of application Ser. No. 256,202 filed Apr. 21, 1981, now U.S. Pat. No. 4,440,905.

BACKGROUND OF THE INVENTION

1. Field of the Invention

This invention relates to the elastomeric impact modifier polymer art, and to formulations of such impact modifiers in rigid thermplastic matrix polymers.

2. Description of the Prior Art

Rigid thermoplastic polymers are widely used in the production of plastics articles, but for many uses it is desirable to improve their impact strength, processability, clarity, color, taste, odor, and other properties. For improved impact strength, the use of elastomeric impact modifier polymers as additives is widely known. In connection with the use of such impact modifiers, the importance of obtaining a good dispersion is known. Advances in dispersability of such impact modifiers in rigid thermoplastics have been achieved by design of the polymeric structure of the impact modifiers, such as the use of multiple stage polymerizations, chemical structure and amount of the varying stages. Also, it is known that lumps of impact modifier polymer particles which do not break down during melt processing form gels in the final product which are visible and detract from optimum impact modification efficiency.

In spite of the wide recognition of this dispersion problem in the art, no adequate universal solution has been available. It is therefore an object of the invention to provide a solution to the problem of dispersion of impact modifier polymer powder in rigid thermplastics. A further object is to provide improved impact modifier compositions which, when used to modify rigid thermoplastics, have a reduced tendency to form gel colonies of impact modifier. A still further object is to provide methods of preparing improved impact modifier compositions.

SUMMARY OF THE INVENTION

These objects, and others as will become apparent from the following disclosure, are achieved by the present invention which in one aspect is an improved impact modifier composition comprising a blend of an elastomeric impact modifier polymer and a dunkelsperser, the weight ratio of said impact modifier polymer to said dunkelsperser being about 99.5/0.5 to about 96/4, said dunkelsperser being a polymer of at least one monomer selected from the group consisting of esters of acrylic acid, esters of methacrylic acid, styrene, substituted styrene, olefin, and unsaturated ester of organic acid, and functioning to substantially reduce gel colonies of impact modifier in rigid thermoplastic polymer formulations. In another aspect, the invention is the rigid thermplastic polymer formulations which contain such improved impact modifier compositions. In still another aspect the invention is a process for preparing the improved impact modifier compositions comprising intimately mixing an elastomeric impact modifier polymer and the dunkelsperser.

DETAILED DESCRIPTION OF THE INVENTION AND THE PREFERRED EMBODIMENTS

Figure 1:
FIG. 1 is a photomicrograph taken at 13.5× power of the product produced in accordance with the invention in Example 6.
Figure 2:
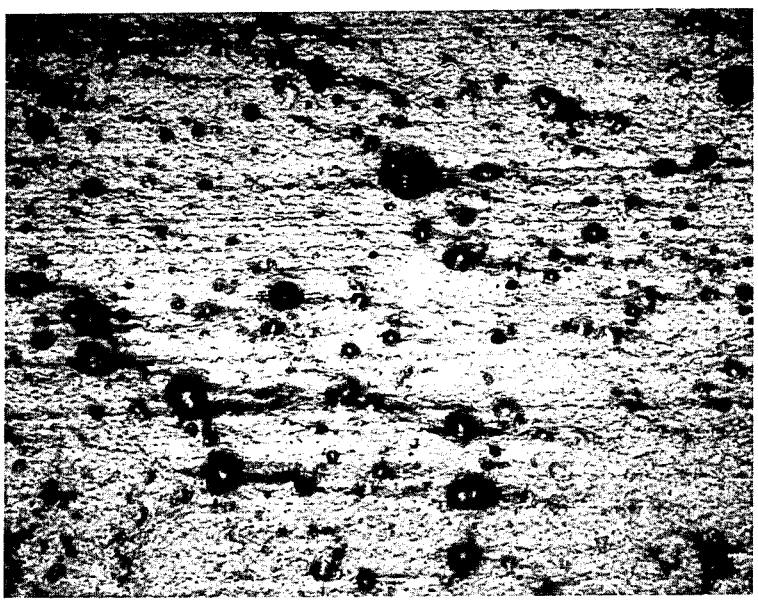
FIG. 2 is a photomicrograph taken at 13.5× power of the control produced in comparative Example 15.

The elastomeric impact modifier polymers which are used in this invention are usually core-shell polymers, i.e., multiple stage polymers having two or more stages, and can be methacrylate-butadiene-styrene (MBS), acrylonitrile-butadiene-styrene (ABS), alkyl acrylate-alkyl methacrylate types, alkyl acrylate-styrene-acrylonitrile types, and the like. These impact modifiers are more fully described in U.S. Pat. Nos. 2,802,809; 3,678,133; 3,251,904; 3,793,402; 2,943,074; 3,671,610; and 3,899,547.

The elastomeric impact modifiers may also be a linear or crosslinked single-stage polymer, such as linear polybutadiene, linear copolymers of butadiene with styrene, acrylonitrile, or alkyl acrylates, crosslinked polybutadiene, crosslinked poly(butyl acrylate-ethyl acrylate), linear poly(butyl acrylate), linear ethylene-propylene copolymer, linear or crosslinked ethylene-propylene-ethylidenenorbornadiene, linear ethylene-vinyl acetate copolymer, linear or crosslinked ethylene-ethyl acrylate copolymer and the like. Further, the elastomeric impact modifier may be a segmented block copolymer such as butanediol-polytetramethylene etherdiol terephthalate ester, or it may be a polymer modified to impart elastomeric behavior, such as chlorinated polyethylene.

The dunkelsperser is a polymer of at least one monomer selected from the group consisting of esters of acrylic acid, esters of methacrylic acid, vinyl aromatic monomer, olefin, and unsaturated ester of organic acid. Specific preferred monomers within the aforementioned class are alkyl ($C_1$ to $C_8$) and cycloalkyl ($C_6$ to $C_9$) acrylates and methacrylates, styrene, alpha methyl styrene, ethylene, propylene, and vinyl acetate. Specific preferred polymers for the dunkelsperser are poly(butyl acrylate), poly(butyl methacrylate), poly(butyl methacrylate/styrene), poly(butyl acrylate/styrene), poly(butyl acrylate/methyl methacrylate), poly(butyl acrylate/butyl methacrylate), and poly(ethyl acrylate). Other examples are poly(vinyl acetate), poly(ethylene/vinyl acetate), polystyrene, poly(methyl methacrylate), poly(alpha methyl styrene), poly(ethyl methacrylate), and the like.

The molecular weight range of suitable dunkelspersers is wide, but depends on the particular polymer user. For example, with poly(butyl acrylate), poly(butyl methacrylate), and poly(ethyl acrylate), the suitable molecular weight range is about 15,000 to 10,000,000, weight average, or even cross-linked, however with poly(methyl methacrylate) the suitable molecular weight range is less than 100,000, preferably below about 30,000, weight average.

The dunkelsperser is intimately blended with the impact modifier polymer to form the improved impact modifier compositions. One suitable method of blending is by making a very thorough, intimate mixture of the dunkelsperser and the impact modifier polymer powder. It has been found that when the impact modifier powder and the dunkelsperser are mixed under normal conditions, the invention does not work; intimate, thorough mixing is necessary. Another method is to emulsion polymerize the dunkelsperser in situ after preparing the impact modifier polymer by emulsion polymerization. The preferred method at the present time, however, is to separately prepare emulsions of the impact modifier polymer and the dunkelsperser, mix the emulsions, and then coisolate the two polymers by spray drying or coagulation. Spray drying is described in detail in *Spray Drying, An Introduction to Principles, Operational Practices, and Applications,* K. Masters, CRC Press, Cleveland, Ohio (1972). Coagulation is salting out the stabilizing surface active agent by slowly adding the polymer emulsion to a 2× volume of electrolyte solution containing any number of salts and/or acids such as NaCl, KCl, $CaCl_2$, $Na_2SO_4$, $MgSO_4$, and the like, and/or acetic acid, oxalic acid, HCl, $HNO_3$, $H_2SO_4$, $H_3PO_4$, etc. The polymer is then separated by filtration and washed several times with fresh water to remove excess electrolyte, and then dried.

The impact modifier and dunkelsperser can also be isolated from the emulsion by evaporation or freeze drying. When following the preferred method, it is important that the two emulsions be compatible. For instance, the soaps should be similar or the same, i.e., of the same ionic species and of similar water solubility or HLB (hydrophile/lipophile balance).

The dunkelsperser is a single stage polymer which is intentionally prepared as separate particles and then blended with the impact modifier polymer. It is not to be confused with any ungrafted polymer which unintentionally forms during preparation of multiple stage impact modifier polymers, since such unintentional polymer does not function to reduce gel formation and is thus not within the scope of this invention.

The weight ratio of impact modifier polymer to dunkelsperser in the compositions of the invention is about 99.5/0.5 to about 96/4. The preferred ratio is about 99/1 to about 97/3, and the optimum weight ratio for certain dunkelspersers and certain impact modifiers is about 98/2.

The rigid thermoplastic matrix polymers which are modified in the invention are vinyl chloride homopolymer and copolymers with, for example, vinyl acetate, propylene, and the like; methyl methacrylate homopolymer and copolymers with, for example, alkyl methacrylates, alkyl acrylates, styrene, acrylonitrile, and the like; styrene homopolymer and copolymers with, for example, α-methyl styrene, acrylonitrile, maleic anhydride, butadiene, and the like, for example SAN, ABS, etc., thermoplastic polyester, such as polyethylene terephthalate, polybutylene terephthalate, polycyclohexane dimethanol terephthalate, copolymers with isophthalic esters and the like; polycarbonates, such as bisphenol A polycarbonate; poly-2,6-dimethyl (phenylene oxide) and its blends with polystyrene; polyglutarimides derired from reaction of amines, for example, with polymethacrylates; and similar materials known to the art.

The weight ratio of rigid thermplastic matrix polymer to improved impact modifier composition is the same as used with conventional impact modifiers. Normally this ratio is about 60/40 to about 98/2.

Other standard additives are used to make up the formulation of the impact modified rigid thermoplastic. For example, processing aids, colorants, pigments, plasticizers, stabilizers, and lubricants.

After formulating by standard techniques, the formulation is melt processed, also by standard techniques, to form a substantially gel-free compound in which the impact modifier is extremely well dispersed and, in some cases, greater impact efficiency is obtained.

The following examples illustrate a few embodiments of the invention. All parts and percentages are by weight unless otherwise indicated.

EXAMPLES

Dunkelsperser polymers of varying compositions are prepared in emulsion using the following ingredients and procedure.

| Charges: | | Parts: |
|---|---|---|
| A | DI water @ pH = 10 using NaOH | 397.5 |
| B | sodium stearate (or SLS) | 0.26 |
| B1 | sodium stearate (or SLS) | 1.49 |
| | monomer(s) | 212.6 |
| C | t-DDM mercaptan chain transfer agent or BDA as disfunctional monomer | Varied |
| D | KPS | 1.1 |
| | Water | 63.3 |
| | Theory Solids | 32.4% |

Procedure:

Charge the water (A) to a one liter four-neck flask fitted with a stirrer, thermometer, nitrogen inlet and a condenser. The water is heated to 65° C. while sweeping with nitrogen. At 65° C. the first emulsifier charge (B) is added and allowed to stir for 10 minutes. The KPS initiator (D) is added followed by 15% of the monomer(s) (C) and the temperatures maintained at 65° C. until an exotherm is observed.

At this point the second emulsifier charge (B1) is added followed by the gradual addition of the balance of the monomers (C) over a one hour period. After completion of the monomer feed, the batch is maintained at 65° C. for 15 minutes then cooled to room temperature.

A PVC masterbatch formulation, without impact modifier, of the following ingredients

| PVC (K-55) Resin | 100 Parts |
|---|---|
| sulfur containing organic tin stabilizer | 2.0 Parts |
| glycerol monostearate | 0.75 Parts |
| partially saponified montan wax | 0.75 Parts |
| blue organic toner | 0.0004 Parts | is prepared in a high intensity Prodex-Henschel blender. The subject impact modifier powders are added (at 10 PHR) to samples of the masterbatch and the powder is again blended in a Prodex-Henschel blender to form the final compound.

The powder compound is extruded into a continuous sheet using a Haake Rheocord Torque Rheometer Model EU-5 fitted with a Haake Rheomex Model 252 extruder. The Rheomex extruder has an 0.75 inch barrel, a single stage 24/1:L/D screw and a 2 inch×0.093 inch slit die. The extruder is run at 20 RPM at zone temperatures of $Z1=178°$ C., $Z2=170°$ C., $Z3=177°$ C. and $Z4=186°$ C. The polymer extrusion rate is 18–19 grams/minute.

The extruder sheets from each compound are rated for the amount of undispersed modifier particles using a Biotran II Colony Counter supplied by New Brunswick Scientific Company. This instrument is designed to count bacterial colonies but has been modified to count the gel particle density in the extruded sheets. The modifications included an auxiliary TV camera and a 75 mm telephoto lens with a 14 mm extender.

In each series of dispersion evaluations at least one sample of modifier without a dispersion aid additive is run as a control. In reporting the data, the average of five absolute counts at five locations on each material are reported along with the percent change from the control.

In the following examples, the following abbreviations are used:
Methyl methacrylate=MMA
Butyl methacrylate=BMA
Lauryl methacrylate=LMA
Styrene=St
Methyl acrylate=MA
Ethyl acrylate=EA
Butyl acrylate=BA
2-ethyl hexyl acrylate=2-EHA
Methacrylate-butadiene-styrene=MBS
Butylene glycol diacrylate=BDA
Acrylonitrile-butadiene-styrene copolymers=ABS

EXAMPLES 1 TO 15

In these examples, reported in Table I, varying low molecular dunkelspersers are prepared in emulsion using 4% t-DDM in the above-described procedure. The molecular weights of dunkelspersers ranged from 16,000 to 35,000, depending on monomer used. The emulsion is mixed with an emulsion of a methacrylate-butadiene-styrene (MBS) multiple stage core-shell polymer. The improved impact modifiers containing dunkelsperser are isolated by coagulation. The dunkelsperser is incorporated at a concentration of 1% for some runs, and 3% for other runs. The ratio of improved impact modifier to PVC formulation is 10 to 103. A control is run without dunkelsperser.

TABLE I-continued

| Ex-ample | Dunkelsperser Polymer of: | 1% Counts | 1% % Change | 3% Counts | 3% % Change |
|---|---|---|---|---|---|
| 4 | (St) | 778 | 50 | — | — |
| 5 | (MA) | — | — | 482 | 69 |
| 6 | (EA) | — | — | 104 | 93 |
| 7 | (BA) | 683 | 56 | 245 | 84 |
| 8 | (2-EHA) | — | — | 1088 | 36 |
| 9 | BA/St:50/50 | 684 | 56 | — | — |
| 10 | MMA/St:50/50 | 786 | 50 | — | — |
| 11 | BMA/St:50/50 | 644 | 59 | — | — |
| 12 | BA/MMA:50/50 | 416 | 73 | — | — |
| 13 | BMA/MMA:50/50 | 978 | 38 | — | — |
| 14 | MA/BMA:50/50 | 680 | 57 | — | — |
| 15 | MBS Control (Comparative) | | | 1568 | |

EXAMPLES 16 TO 24

In these examples, the relationship between polymer compositions and molecular weight is explored. A series of low, medium and high molecular weight dunkelspersers was prepared in which the molecular weight was varied by using 4%, 1% and 0% t-dodecyl mercaptan chain transfer agent, respectively. In addition, samples were prepared with the incorporation of a difunctional crosslinking monomer butyleneglycol diacrylate (BDA) at 0.1%. Dispersion data was obtained in the procedure of the previous examples and are presented in Table II.

Poly-BA and poly-BMA are effective dunkelspersers over the range of molecular weights studied. The effectiveness of butyl acrylate copolymers with MMA and styrene and the styrene homopolymer diminish with increasing molecular weight. Poly-MMA does not appear to be effective at high molecular weight.

TABLE II

Effect of Additive Molecular Weight on the Dispersion of the MBS Modifier in PVC

| Example | Polymer Composition | 4% t-DDM Count | 4% t-DDM Δ % | 1% t-DDM Count | 1% t-DDM Δ % | No RSH Count | No RSH Δ % | 0.1% BDA Count | 0.1% BDA Δ % |
|---|---|---|---|---|---|---|---|---|---|
| | | 1% Additive on Modifier | | | | | | | |
| 16 | BA | 683 | 56 | 758 | 52 | 1042 | 34 | 871 | 44 |
| 17 | BMA | 820 | 48 | 727 | 54 | 882 | 44 | 847 | 46 |
| 18 | Styrene | 778 | 50 | 960 | 39 | 1202 | 23 | 1532 | 2 |
| 19 | MMA | 1181 | 24 | — | — | 1863 | — | 2104 | — |
| 20 | MBS Control (Comparative) | | | | | 1560 | | | |
| | | 3% Additive on Modifier | | | | | | | |
| 21 | BA/St | 365 | 79 | 385 | 78 | 518 | 70 | 1017 | 41 |
| 22 | MBS Control (Comparative) | | | | | 1711 | | | |
| 23 | BA/MMA | 118 | 92 | 98 | 94 | 219 | 81 | 517 | 66 |
| 24 | MBS Control (Comparative) | | | | | 1498 | | | |

TABLE I

| Ex-ample | Dunkelsperser Polymer of: | 1% Counts | 1% % Change | 3% Counts | 3% % Change |
|---|---|---|---|---|---|
| 1 | (MMA) | 1347 | 14 | — | — |
| 2 | (BMA) | 820 | 48 | — | — |
| 3 | (LMA) | — | — | 1605 | 0 |

EXAMPLES 25 TO 31

Certain dunkelspersers from Examples 7, 2, 11, 9, 12, and 14 were examined for the effect of the additive level on the dispersion of the MBS modifier in PVC.

All of the samples evaluated show 90% improvement in modifier dispersion at only a 2% additive level which is equivalent to only 0.2% on total PVC compound. The results are reported in Table III.

TABLE III

Effect of Additive Level on the Dispersion of the MBS Modifier in PVC

| | Dunkelsperser Polymer | Dispersion, Colony Counts | | | | | |
|---|---|---|---|---|---|---|---|
| | | Add @ 1% | | Add @ 2% | | Add @ 3% | |
| Example | Composition | Counts | % Change | Counts | % Change | Counts | % Change |
| 25 | BA | 395 | 66 | 112 | 90 | 49 | 96 |
| 26 | BMA | 424 | 63 | 125 | 89 | 51 | 96 |
| 27 | BMA/St | 313 | 73 | 111 | 90 | 54 | 95 |
| 28 | MA/St | 303 | 74 | 90 | 92 | 57 | 95 |
| 29 | BA/MMA | 198 | 83 | 84 | 93 | 53 | 95 |
| 30 | BA/BMA | 451 | 61 | 113 | 90 | 72 | 94 |
| 31 | MBS Control (Comparative) | | | 1160 | | | |

EXAMPLES 32 AND 33

In the previous examples the low molecular weight additive/MBS emulsion blend was isolated by coagulation, washing and vacuum drying. In these examples the additive/modifier blend (both polymers prepared using sodium lauryl sulfate emulsifier) was isolated by conventional spray drying.

Dispersion data in Table IV shows that the dunkelsperser is indeed effective at improving the dispersion properties of a spray dried MBS impact modifier.

TABLE IV

| Example | Additive Type | Additive Level | Dispersion Counts First Time | Repeat |
|---|---|---|---|---|
| 32 | PBA + 3% t-DDM | 0 | 195 | 284 |
| | | 1 | 200 | 114 |
| | | 2 | 50 | — |
| 33 | BA/St/MMA 38/58/4 + 1.75% t-DDM | 0 | 229 | — |
| | | 1 | 23 | — |

EXAMPLE 34

A dunkelsperser was used in this example to improve an all acrylic type impact modifier designed for improving the toughness of poly(methyl methacrylate). An impact modifier emulsion prepared in accordance with Example 2 of U.S. Pat. No. 3,793,402 was blended with a low molecular weight polybutyl acrylate emulsion (3% t-DDM chain transfer agent) and the blend isolated by spray drying. The spray dried powder is subsequently blended with poly(methyl methacrylate) pellets and the blend coextruded into thin sheets. The sheets were examined for the number of gel particles greater than 25μ per every 3 square inches of sheet. The results of this experiment in Table V show that the low molecular weight poly-BA is indeed an effective dispersion aid in this all-acrylic system.

TABLE V

| Additive Level | Gel Counts (Gels greater than 25μ per 3 square inches) |
|---|---|
| 0 | 35 |
| 0.8 | 26 |
| 1.7 | 14 |
| 2.5 | 8 |

EXAMPLE 35

To prepare the dunkelsperser in situ the following procedure should be followed. Charge 323.3 parts of impact modifier emulsion (30% solids or 97 parts of polymer solids) to a one-liter four-neck flask fitted with a stirrer, thermometer, nitrogen inlet and condenser. Gradually add a 10% solution of an emulsifier, preferably the emulsifier used to synthesize the modifier emulsion, to reduce the surface tension of the emulsion to the CMC (critical micelle concentration). (Surface tension is measured using a Du Nouy tensiometer). The emulsion is then heated to 65° C. while sweeping with nitrogen. A separate monomer emulsion consisting of 3 parts of monomer, 6 parts of water, 0.03 parts of emulsifier, 0.12 parts of t-dodecyl mercaptan and 0.006 parts of t-butyl hydroperoxide is prepared and charged to the flask, followed immediately by 0.006 parts sodium formaldehyde sulfoxylate. Maintain the temperature at 65° C. for one hour then cool, filter and proceed to isolate as in previous examples.

EXAMPLE 36

The dunkelsperser of Example 6 was co-isolated with the MBS core-shell polymer at a concentration of 3% by the method of Examples 1–15. A sample of the same MBS was coagulated in a similar manner without dunkelsperser. These impact modifiers were blended in a ⅓ ratio with a styrene/acrylonitrile 75–25 polymer (Tyril 867) and extruded on the Haake Rheocord extruder at 400° F. at 20, 50 and 80 rpm. An unmodified styrene/acrylonitrile copolymer was also run. The torque for the blend with dunkelsperser was less than for the blend without.

The control (no impact modifier) was clear with only a trace of pinpoint gels. The blend containing the impact modifier with no dunkelsperser had both large and small size gels and was unattractive in appearance. The blend containing MBS modifier with co-isolated dunkelsperser had only pinpoint gel; the level of gel was reduced to almost that of the unmodified control at 50 and 80 rpm. The impact modified strips were qualitatively tougher than the unmodified control.

While the invention has been described and exemplified in great detail herein, various modifications, alterations, and changes should become readily apparent to those skilled in this art without departing from the spirit and scope of the invention.

I claim:

1. A process for preparing an improved impact modifier composition comprising an intimate admixture of from about 99.5 to about 96 parts by weight of an elastomeric impact modifier polymer prepared by emulsion polymerization and from about 0.5 to about 4 parts by weight of a dunkelsperser polymer or copolymer formed from at least 50 weight percent of at least one monomer selected from the group consisting of styrene, substituted styrene, an olefin, and an unsaturated ester of an organic acid different from the methyl ester of methacrylic acid, said improved impact modifier composition being formed by a free radical initiated polymerization of said monomer or monomers in the presence of an adjusted emulsion containing said elastomeric impact modifier polymer by adding an emulsifier to reduce the surface tension of the emulsion containing said elastomeric impact modifier polymer to or below its critical micelle concentration;

heating the adjusted emulsion to a temperature sufficient to initiate the subsequent free radical initiated polymerization of said monomer or monomers;

adding to said heated, adjusted emulsion a second emulsion containing said monomer or monomers and at least one free radical initiator;

allowing polymerization of said monomer or monomers to form a dunkelsperser polymer in intimate admixture with said elastomeric impact modifier polymer; and isolating the improved impact modifier composition from said emulsion.

* * * * *